(12) United States Patent
Ichikawa et al.

(10) Patent No.: US 11,465,669 B2
(45) Date of Patent: Oct. 11, 2022

(54) ELECTRIC POWER STEERING DEVICE

(71) Applicant: Mitsubishi Electric Corporation, Tokyo (JP)

(72) Inventors: Takanori Ichikawa, Tokyo (JP); Akira Kimishima, Tokyo (JP); Satoshi Iohara, Tokyo (JP); Takahisa Kawaguchi, Tokyo (JP); Kentaro Urimoto, Tokyo (JP)

(73) Assignee: Mitsubishi Electric Cornoration, Tokyo (JP)

( * ) Notice: Subject to any disclaimer, the term of this patent is extended or adjusted under 35 U.S.C. 154(b) by 236 days.

(21) Appl. No.: 16/634,622

(22) PCT Filed: Sep. 28, 2017

(86) PCT No.: PCT/JP2017/035212

§ 371 (c)(1),
(2) Date: Jan. 28, 2020

(87) PCT Pub. No.: WO2019/064423

PCT Pub. Date: Apr. 4, 2019

(65) Prior Publication Data

US 2021/0371006 A1  Dec. 2, 2021

(51) Int. Cl.
  *B62D 5/04*    (2006.01)
  *H02K 11/33*   (2016.01)
  *H02K 9/22*    (2006.01)

(52) U.S. Cl.
  CPC ......... *B62D 5/0406* (2013.01); *B62D 5/0409* (2013.01); *B62D 5/0481* (2013.01); *H02K 9/227* (2021.01); *H02K 11/33* (2016.01)

(58) Field of Classification Search
  CPC .. B62D 5/0406; B62D 5/0409; B62D 5/0481; H02K 11/33; H02K 9/277
  See application file for complete search history.

(56) References Cited

U.S. PATENT DOCUMENTS 9,088,195 B2 * 7/2015 Yamasaki .............. H02K 11/33
10,556,618 B2 * 2/2020 Yamasaki .............. H02K 5/225
(Continued)

FOREIGN PATENT DOCUMENTS

EP  3 447 887 A1   2/2019
JP  2014-225998 A  12/2014
(Continued)

OTHER PUBLICATIONS

Communication dated Dec. 8, 2020 by the Japanese Patent Office in application No. 2019-545486.
(Continued)

*Primary Examiner* — Tony H Winner
(74) *Attorney, Agent, or Firm* — Sughrue Mion, PLLC; Richard C. Turner

(57) ABSTRACT

An electric power steering device includes a motor and a control unit that are arranged coaxially with each other in an axial direction of an output shaft and integrated with each other. The control unit includes power modules configured to supply current to the motor, a heat sink, a control board configured to output a control signal to the power modules, and a rotation sensor. The power modules, a column portion of the heat sink, and the control board are arranged in parallel to the axial direction of the output shaft. The rotation sensor is provided in a recess formed in a base portion of the heat sink at an opposite position to a sensor rotor mounted to an end portion of the output shaft on the control unit side.

19 Claims, 6 Drawing Sheets

(56) References Cited

U.S. PATENT DOCUMENTS

| | | | | |
|---|---|---|---|---|
| 2005/0167183 A1* | 8/2005 | Tominaga | ............ | H05K 7/1432 |
| | | | | 180/444 |
| 2014/0339966 A1 | 11/2014 | Tomizawa et al. | | |
| 2016/0254732 A1 | 9/2016 | Kojima et al. | | |
| 2017/0015347 A1* | 1/2017 | Asao | ...................... | B62D 5/046 |
| 2018/0167183 A1* | 6/2018 | Zhang | .................. | H04L 1/0027 |

FOREIGN PATENT DOCUMENTS

| | | | |
|---|---|---|---|
| JP | 5807846 B2 | 11/2015 | |
| JP | 2016-163414 A | 9/2016 | |
| JP | 2016-163416 A | 9/2016 | |
| JP | 2018-207641 A | 12/2018 | |
| WO | 2017/154498 A1 | 9/2017 | |

OTHER PUBLICATIONS

Communication dated Aug. 25, 2020 from European Patent Office in EP Application No. 17927672.0.
International Search Report for PCT/JP2017/035212 dated Jan. 9, 2018 [PCT/ISA/210].

* cited by examiner

ELECTRIC POWER STEERING DEVICE

CROSS REFERENCE TO RELATED APPLICATIONS

This application is a National Stage of International Application No. PCT/JP2017/035212 filed Sep. 28, 2017.

TECHNICAL FIELD

The present invention relates to an electric power steering device including a motor and a control unit integrated with each other, and more particularly, to a structure of the control unit.

BACKGROUND ART

In related-art driving devices, a motor and a control unit are arranged coaxially in an axial direction of an output shaft of the motor, and are integrated with each other. Some of the related-art driving devices have such a structure that, for example, a stator and a rotor are incorporated in a case of the motor, and main components of the control unit provided near the motor are stacked on one another in the axial direction for assembly. Moreover, there is also a related art having a structure in which a power module having incorporated therein switching elements for current supply to a motor is provided in parallel to an axial direction of an output shaft (see, for example, Patent Literature 1). Further, there is another related art having a structure in which a control board is also provided in parallel to an output shaft (see, for example, Patent Literature 2).

CITATION LIST

Patent Literature

[PTL 1] JP 5807846 B2
[PTL 2] JP 2016-163416 A

SUMMARY OF INVENTION

Technical Problem

The related-art devices disclosed in Patent Literatures 1 and 2 have the structure in which a motor is integrated with a control unit provided at an end portion of the motor on an opposite side to an output side of the output shaft of the motor. In consideration of mounting of the related-art device configured as described above to a vehicle, when a control unit is larger in a radial direction of a motor, it becomes difficult to install the device to the vehicle in many cases due to restrictions on mounting to the vehicle. In contrast, the related-art device can have a relatively larger length in the axial direction of the output shaft of the motor in many cases. In view of the above, the control unit is required to have an area in the radial direction that is equivalent to or smaller than that of the motor in consideration of mounting of the related-art device to the vehicle. To that end, in related-art devices, a power module and a heat sink as components of a control unit are provided in parallel to an axial direction of an output shaft, that is, provided vertically. An opposite side to the output side of the output shaft of the motor is hereinafter referred to as "non-output side".

In Patent Literature 1, not only the power module but also a heat sink provided in contact with the power module to release heat from the power module are provided vertically. In Patent Literature 1, however, a control board is provided perpendicularly to the axial direction of the output shaft, that is, provided horizontally. This leads to a problem in that, when a larger number of components are to be mounted on the control board for redundancy, for example, a product size is increased, particularly in a radial direction.

Further, in Patent Literature 1, the control board is provided on the motor side of the heat sink. Further, in Patent Literature 1, a rotation sensor is provided on the control board so as to face a magnet provided at an end portion of the output shaft on the control unit side. This leads to a problem in that a product size is increased, particularly in the axial direction.

Moreover, in Patent Literature 1, motor current paths for relaying phase currents between the motor and the control unit pass a region on a radially outer side of the control board to be connected to the power module. In this case, in order to prevent an increase in radial dimension, the control board is required to be reduced in radial dimension, and this causes reduction in mountable area of the control board. Meanwhile, in a case of securing a mountable area of the control board, it is required to secure, in the region on the radially outer side of the control board, a sufficient space for allowing the motor current paths to pass. This causes an increase in radial dimension of the control unit and leads to a problem in that a product size is increased, particularly in the radial direction.

In Patent Literature 2, the power module, the heat sink, and the control board are provided vertically. Thus, the structure of Patent Literature 2 is improved as compared to Patent Literature 1 in terms of downsizing in the radial direction. In Patent Literature 2, however, the output shaft of the motor is inserted into a through-hole formed at the center of the heat sink. Moreover, a detection magnet is provided at the non-output side end portion of the output shaft of the motor. Further, a magnetic sensor is provided so as to face the detection magnet with a certain distance kept from a non-output side end surface of the heat sink. This leads to a problem in that a product size is increased, particularly in the axial direction.

Further, in Patent Literature 2, motor current paths for relaying phase currents between the motor and the control unit are provided in a region on a radially outer side of the power module. Thus, in a case of maintaining a given outer diameter of the control unit, it is required to dispose the power module on a radially inner side so as to secure a space for the motor current paths. In this case, positions of signal terminals extending from the power module are shifted toward the radially inner side, so that the width of the control board is reduced, and a mountable area of the control board is reduced. Consequently, it is required to increase an axial length of the control board so as to secure a space for the mountable area, and this leads to a problem in that a product size is increased, particularly in the axial direction.

The present invention has been made to solve the problems described above, and provides an electric power steering device which is configured such that main components of a control unit are provided vertically, and with which it is possible to reduce an increase in product size.

Solution to Problem

According to one embodiment of the present invention, there is provided an electric power steering device, including: a motor; and a control unit, which is provided side by side in a row with the motor in an axial direction of an output shaft of the motor, and is integrated with the motor. The control unit includes: a power module including a plurality of switching elements configured to supply current to the motor; a control board configured to output a control signal to each of the plurality of switching elements; a heat sink configured to allow heat radiation from the control unit; a housing that forms an outer case of the control unit; a sensor rotor mounted to an end portion of the output shaft on the control unit side; and a rotation sensor configured to detect rotation of the sensor rotor. The heat sink includes: a base portion provided on the motor side in the housing; and a column portion extending from the base portion toward an opposite side to the motor along an extension of the output shaft. The power module and the control board are arranged, in parallel to the output shaft, in the housing. The rotation sensor is provided in a recess formed in an opposite position to the sensor rotor, of the base portion.

Advantageous Effects of Invention

According to the present invention, it is possible to prevent an increase in product size with the configuration in which the column portion of the heat sink, the power module, and the control board are provided vertically.

DESCRIPTION OF EMBODIMENTS

First Embodiment

Figure 1:
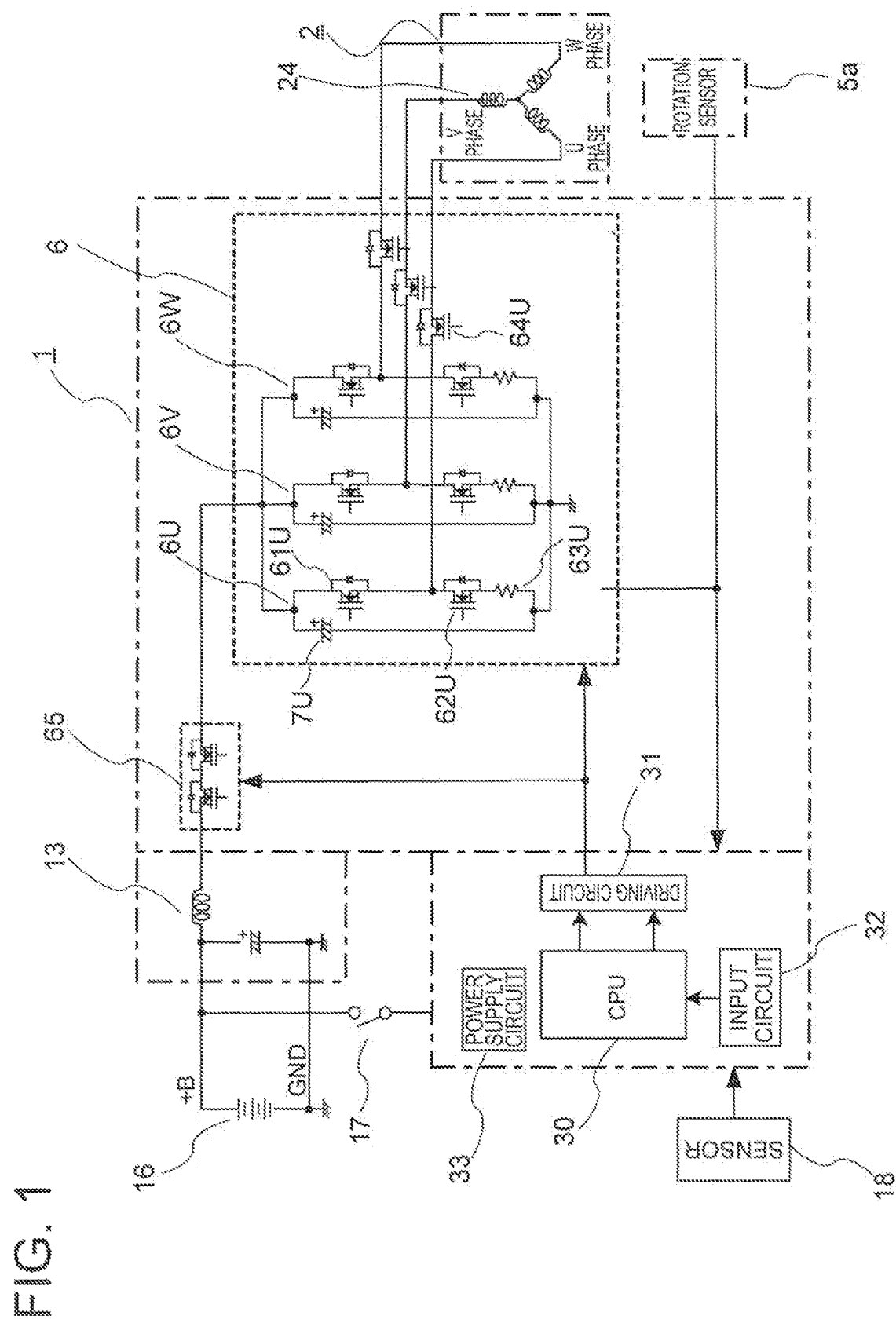
FIG. 1 is a circuit diagram for illustrating an electric power steering device according to a first embodiment of the present invention.
Figure 2:
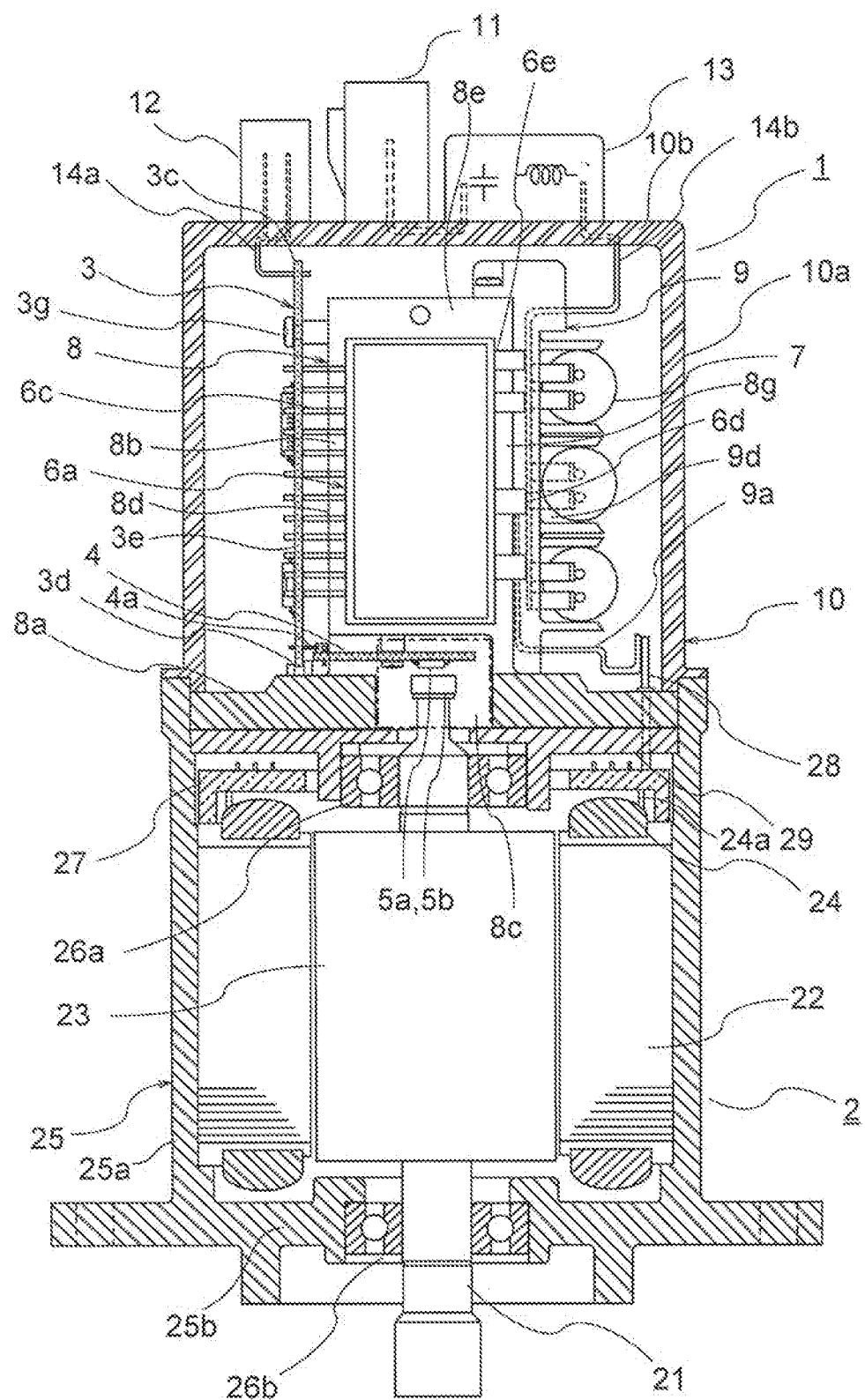
FIG. 2 is a sectional view of the electric power steering device according to the first embodiment of the present invention.
Figure 3:
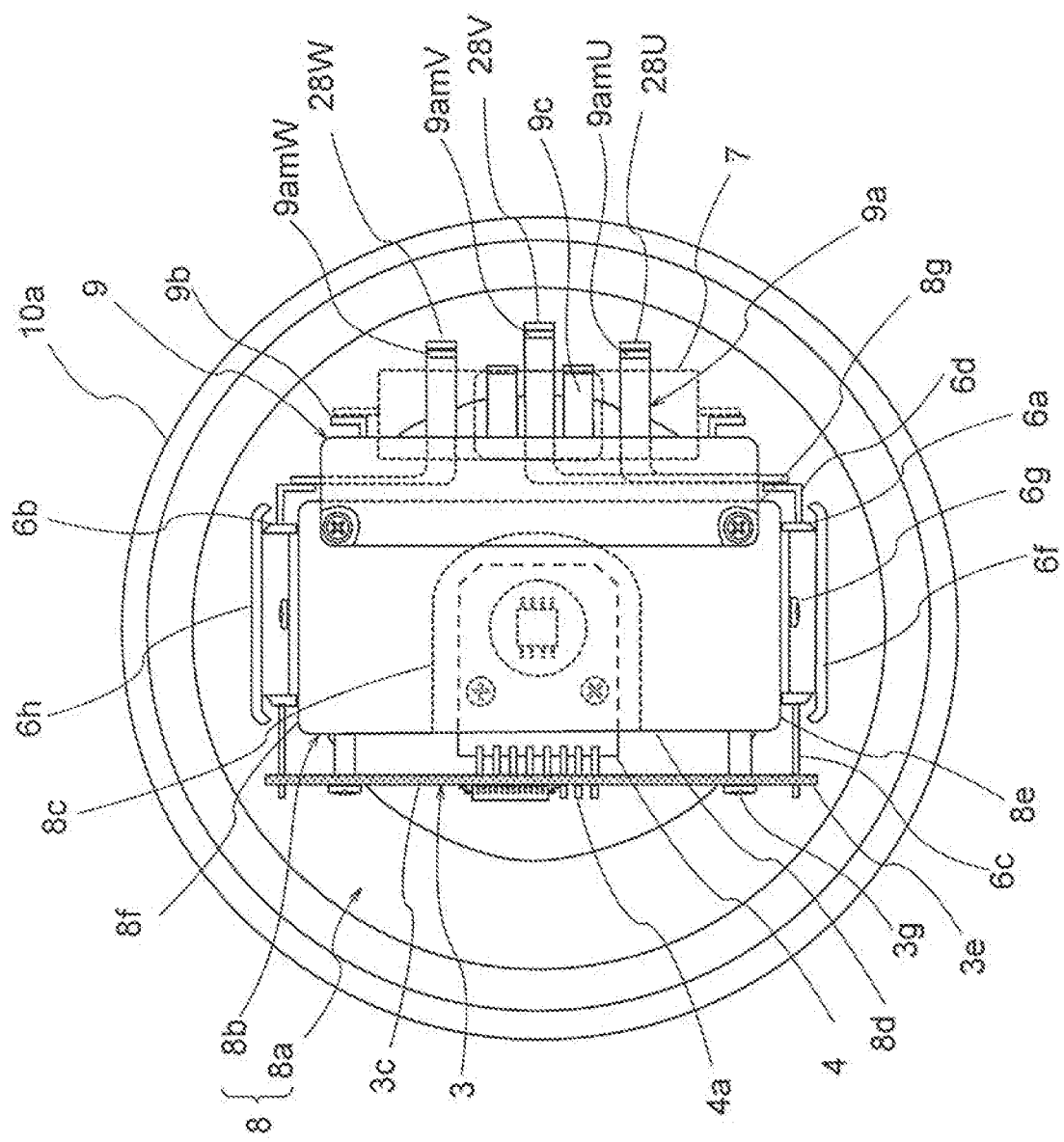
FIG. 3 is a transparent view of a control unit of the electric power steering device according to the first embodiment of the present invention and its surroundings, as viewed from a non-output side.
Figure 4:
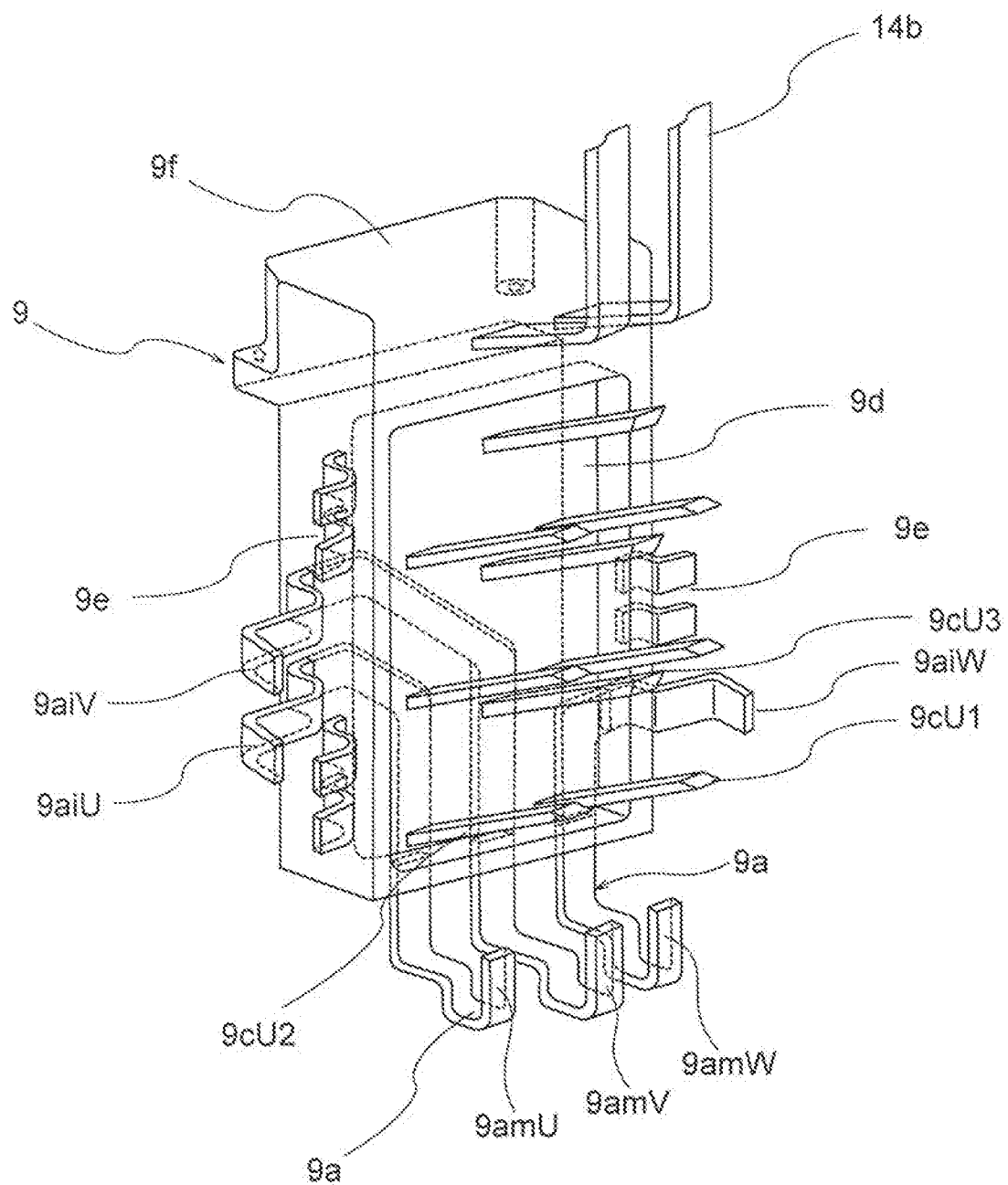
FIG. 4 is a perspective view of a relay member of the electric power steering device according to the first embodiment of the present invention.

FIG. 1 is a circuit diagram for illustrating an electric power steering device according to a first embodiment of the present invention. FIG. 2 is a sectional view of the electric power steering device according to the first embodiment of the present invention. FIG. 3 is a transparent view of a control unit of the electric power steering device according to the first embodiment of the present invention and its surroundings, as viewed from a non-output side. FIG. 4 is a perspective view of a relay member of the electric power steering device according to the first embodiment of the present invention.

In FIG. 1 and FIG. 2, the electric power steering device includes a control unit 1 and a motor 2. The control unit 1 is provided on one side of the motor 2 in an axial direction of an output shaft 21 thereof so that the control unit 1 and the motor 2 are arranged side by side in a row and integrated together. Further, the electric power steering device is disposed with the axial direction of the output shaft 21 of the motor 2 being set as a vertical direction, and with the control unit 1 being placed in an upper position. The motor 2 outputs power from a lower end portion of the output shaft 21 to, for example, a speed reducer (not shown).

The motor 2 is assumed to be a three-phase motor herein, but may be a multi-phase coil motor having three or more phases. The control unit 1 includes, for example, a control board 3 on which a CPU 30, various circuits, and other components are mounted, and an inverter circuit 6 and a power supply relay 65 configured to supply current to the motor 2. Further, the electric power steering device receives power from an in-vehicle battery 16 and an ignition switch 17, and receives various types of information from a sensor 18.

First, a circuit configuration of the control unit 1 is described in detail.

The control board 3 includes, for example, the CPU 30 configured to calculate a control amount for supply of power to the motor 2 based on information from the sensor 18 such as a vehicle speed sensor or a torque sensor used to detect a steering torque of a steering wheel, and information from a rotation sensor 5a, a driving circuit 31 configured to drive the inverter circuit 6, an input circuit 32, and a power supply circuit 33. Further, a power supply system (+B, ground) has a filter 13 inserted thereto to reduce noise. The filter 13 includes a coil and a capacitor. Further, a power supply relay 65 configured to open/close a +B power supply line is inserted in the middle thereof. The power supply relay 65 includes two switching elements and two parasitic diodes that allow current to flow in forward and reverse directions with respect to a current supply direction. The power supply relay 65 can forcibly interrupt power supply, for example, when any failure occurs in the inverter circuit 6 or the motor 2. Further, the power supply relay 65 can cut off a line in which current flows, upon reverse connection of the battery 16. In this way, the power supply relay 65 also serves as a so-called protection against reverse connection of the battery.

The inverter circuit 6 includes three circuit units 6U, 6V, and 6W corresponding to different phases of three-phase windings 24. The three circuit units 6U, 6V, and 6W have the same configuration and hence, a description is given only of the circuit unit 6U. The circuit unit 6U includes an upper-arm switching element 61U, a lower-arm switching element 62U, and a relay switching element 64U having a relay function for opening/closing between the U-phase winding and a node between the upper-arm switching element 61U and the lower-arm switching element 62U. The upper-arm switching element 61U and the lower-arm switching element 62U are PWM-driven in response to a command from the CPU 30. To that end, a capacitor 7U is connected in parallel to the upper-arm switching element 61U and the lower-arm switching element 62U so as to reduce noise. Further, a shunt resistor 63U is connected in series to the upper-arm switching element 61U and the lower-arm switching element 62U so as to detect current flowing through the motor 2. For ease of description, the capacitors, the upper-arm switching elements, the lower-arm switching elements, and the relay switching elements of the circuit units 6U, 6V, and 6W are denoted by 7, 61, 62, and 64, respectively.

To describe the outline of functions, the CPU 30 calculates an amount of current to be supplied to the windings 24 based on input information from the sensor 18 and then, causes the driving circuit 31 to drive the inverter circuit 6 based on the calculation result. With this configuration, the switching elements 61, 62, and 64 of each phase are driven to supply current to the windings 24. Further, the CPU 30 controls driving of the power supply relay 65 through use of the driving circuit 31, and also calculates a rotation position or speed of the motor 2 based on information from the rotation sensor 5a so as to utilize the calculated value for the control.

With reference to FIG. 2, the configuration of the motor 2 is described. Here, one side in the axial direction of the output shaft 21, that is, an upper side in FIG. 2 is referred to as "non-output side". Another side in the axial direction of the output shaft 21, that is, a lower side in FIG. 2 is referred to as "output side".

The motor 2 includes, for example, a motor case 25, and a stator 22 and a rotor 23 provided inside the motor case 25. The motor case 25 has a bottomed cylindrical shape defined by a cylindrical portion 25a and a bottom portion 25b that closes an output side opening of the cylindrical portion 25a. The motor case 25 is made of metal. It is desired that the motor case 25 be made of aluminum in consideration of heat radiating property and an outer shape. A frame 29 is made of metal and has a disk shape. The frame 29 is inserted and held, for example, by press-fitting or shrink-fitting, in a non-output side opening of the cylindrical portion 25a so as to close the non-output side opening of the cylindrical portion 25a. The motor 2 is separate and independent from the control unit 1 across the frame 29.

The stator 22 is inserted and held, for example, by press-fitting or shrink-fitting, in the cylindrical portion 25a of the motor case 25. The stator 22 includes the three-phase windings 24. An annular wiring portion 27 is provided at an output side portion of the frame 29 and near the windings 24. Individual terminal ends 24a of the three-phase windings 24 are connected to the annular wiring portion 27. Phase terminals 28 through which three-phase currents flow to drive the motor 2 extend from the annular wiring portion 27, pass through the frame 29, and are led out to the non-output side.

The rotor 23 is fixed to the output shaft 21 so as to be rotatable in the motor case 25. The output shaft 21 is supported by a bearing 26a provided at an axial center of the frame 29, and a bearing 26b provided at an axial center of the bottom portion 25b. The rotor 23 is coaxially provided in the stator 22. A sensor rotor 5b is provided at an end of the output shaft 21 protruding from the frame 29. Although not shown, a plurality of permanent magnets are arranged on an outer peripheral surface of the rotor 23 at regular pitches with N pole and S pole alternately arranged in a circumferential direction.

With reference to FIG. 2 to FIG. 4, the configuration of the control unit 1 is described next.

An area of the control unit 1 in a radial direction, that is, a direction orthogonal to the output shaft 21 is required to be equivalent to or smaller than that of the motor 2. To that end, the control unit 1 adopts a vertical arrangement for main components; the components are arranged in parallel to the output shaft 21.

The control unit 1 is covered with a resin-made housing 10 at its outer layer. The housing 10 has a bottomed cylindrical shape defined by a cylindrical peripheral wall 10a that covers the components of the control unit 1, and a bottom portion 10b that closes an opening of the peripheral wall 10a on one side. An non-output side end surface of the bottom portion 10b is a flat surface orthogonal to the axial direction of the output shaft 21. The housing 10 is fitted, with its opening facing downward, into the opening of the cylindrical portion 25a of the motor case 25, and is fixed to the cylindrical portion 25a with use of screws (not shown). The non-output side end surface of the bottom portion 10b of the housing 10 has provided thereon at least one power supply connector 11 to be connected to the battery 15 as an external power supply, and a plurality of signal connectors 12 to be connected to the sensor 18. Further, the non-output side end surface of the bottom portion 10b of the housing 10 has mounted thereon, for example, the filter 13 that is a relatively large component. The power supply connector 11 and the signal connector 12 are molded integrally with the housing 10. In the housing 10, for example, wirings of the power supply connector 11, the signal connector 12, and the filter 13, signal terminals 14a of the signal connector 12, and a power supply terminal 14b of the power supply connector 11 are insert-molded.

The housing 10 has provided therein, for example, a heat sink 8, the control board 3, power modules 6a and 6b having incorporated therein a plurality of switching elements as components of the inverter circuit 6 and the power supply relay 65, and smoothing capacitors 7.

As illustrated in FIG. 3, the heat sink 8 is made of a material having high heat conductivity such as aluminum and copper, and includes a disk-like base portion 8a and a rectangular column portion 8b formed upright at the center of the base portion 8a. The base portion 8a of the heat sink 8 is provided inside the non-output side opening of the cylindrical portion 25a. The base portion 8a is pressure-held between the frame 29 and the peripheral wall 10a of the housing 10 mounted to the cylindrical portion 25a. Thus, the heat sink 8 fixed to the motor 2. The base portion 8a is in contact with an inner peripheral wall surface of the cylindrical portion 25a and also with a non-output side end surface of the frame 29. The column portion 8b is located on the extension of the output shaft 21 in the axial direction, inside the housing 10. The column portion 8b includes mounting portions 8d, 8e, 8f, and 8g each defined by a flat surface parallel to the axial direction of the output shaft 21. The control board 3 is mounted to the mounting portion 8d. The power module 6a is mounted to the mounting portion 8e located on one side of the mounting portion 8d in the circumferential direction. The power module 6b is mounted to the mounting portion 8f located on the other side of the mounting portion 8d in the circumferential direction. Further, the smoothing capacitors 7 and a relay member 9 are mounted to the mounting portion 8g opposite to the mounting portion 8d.

The base portion 8a has a plurality of holes through which the phase terminals 28 and other wiring members provided between the motor 2 and the control unit 1 pass. Further, a recess 8c is formed in the base portion 8a. The non-output side end portion of the output shaft 21 is inserted into the recess 8c. The rotation sensor as mounted on a rotation sensor substrate 4 is provided in the recess 8c so as to face the sensor rotor 5b mounted to the non-output side end portion of the output shaft 21.

The control board 3 has mounted thereon, for example, the CPU 30, the driving circuit 31, the input circuit 32, and the power supply circuit 33. The control board 3 is formed into a flat rectangular plate, and is mounted in parallel to the mounting portion 8d of the column portion 8b. The control board 3 mounted to the mounting portion 8d has an upper edge 3c close to the signal connector 12, a lower edge 3d close to the motor 2, and a side edge 3e close to the power modules 6a and 6b. The upper edge 3c, the lower edge 3d, and the side edge 3e each have a plurality of connect ion holes.

The connection holes of the upper edge 3c of the control board 3 are to be connected to the signal terminals 14a led out of the bottom portion 10b of the housing 10. The connection holes of the lower edge 3d of the control board 3 are to be connected to signal terminals 4a led out of the rotation sensor substrate 4 on which the rotation sensor 5a is mounted. The connection holes of the side edge 3e of the control board 3 are to be connected to signal terminals 6c led out of the power modules 6a and 6b. Those connection holes and the signal terminals 14a, 4a, and 6c are connected to each other, for example, by soldering to thereby form an electric circuit and allow signal transmission/reception required for drive control of the motor.

The control board 3 further includes fixation portions 3g to be fixed, for example, with screws to the mounting portion 8d of the heat sink 8. In this example, two fixation portions 3g are provided, but the number of fixation portions 3g is not limited to two, and can be one, or three or more.

The power module 6a is obtained by sealing with a resin the switching elements 61, 62, and 64 as components of the U-phase circuit unit 6U and the V-phase circuit unit 6V of the inverter circuit 6, which are being mounted on wirings made from a copper plate, for example. The power module 6b is obtained by sealing with a resin the switching elements as components of the W-phase circuit unit 6W of the inverter circuit 6 and the power supply relay 65, which are being mounted on wirings made from a copper plate, for example. With this configuration, a package size for the power modules 6a and 6b can be reduced, and uniform heat radiation performance of the switching elements as components of the circuits can be achieved. Here, it is also possible to seal with a resin the switching elements as components of the three-phase circuit units of the inverter circuit 6, to thereby obtain the power module 6a, and to seal with a resin the switching elements as components of the power supply relay 65, to thereby obtain the power module 6b.

The twelve signal terminals 6c for driving the incorporated switching elements are led out of edges closer to the mounting portion 3d, of each of the power modules 6a and 6b and connected, for example, by soldering to the connection holes of the side edge 3e of the control board 3, to thereby form an electric circuit.

Further, power supply terminals 6e for supplying current from an external power supply and feeding terminals 6d for supplying three-phase currents to the motor 2 are led out of edges closer to the mounting portion 8g, of the power modules 6a and 6b, and are connected, for example, by welding to a plurality of terminals provided on the relay member 9, to thereby form an electric circuit.

Further, the power modules 6a and 6b are mounted to the column portion 8b by fixing fixation members 6f and 6h to the column portion 8b of the heat sink 8, for example, with screws 6g. With this structure, the power modules 6a and 6b are brought into close contact with the column portion 8b of the heat sink 8, to thereby effectively release heat generated in the switching elements to the heat sink 8 side. Moreover, when the fixation members 6f and 6h are made of metal, for example, copper, heat generated in the switching elements is released via the fixation members 6f and 6h. With this, the heat radiation property of the switching elements of the power modules 6a and 6b is improved. Further, even when the fixation members 6f and 6h are made of conductive material that is not copper, a shielding effect against radio noise generated in the power modules 6a and 6b, for example, is obtained.

An outer peripheral wall surface of the base portion 8a of the heat sink 8 is brought into close contact with an inner peripheral wall surface of the non-output side opening of the cylindrical portion 25a of the motor case 25. Moreover, an output side surface of the base portion 8a is brought into close contact with the non-output side surface of the frame 29. With this structure, heat received by the column portion 8b is transferred to the motor case 25 and the frame 29 via the base portion 6a, and then is released to the outside. The heat generated in the switching elements of the power modules 6a and 6b are thus effectively released.

The column portion 8b of the heat sink 8 has the two mounting portions 8e and 8f on which to mount the power modules 6a and 6b, but in a case of obtaining the switching elements of the inverter circuit 6 and the power supply relay 65 with use of one power module, one of the mounting portions 8e and 8f is used to mount the power module.

With reference to FIG. 3 and FIG. 4, the relay member 9 is described in detail.

The relay member 9 includes an insulating resin-molded member 9f, and a plurality of terminals formed by insert-molding in the resin-molded member 9f, which form an electric circuit. The relay member 9 includes accommodating portions 9d for accommodating the plurality of smoothing capacitors 7.

The plurality of terminals formed by insert-molding in the resin-molded member 9f are roughly divided into power supply terminals 9e and feeding terminals 9a.

The power supply terminals 9e are connected to the power supply terminals 14b from the power supply connector 11, the power supply terminals 6e of the power modules 6a and 6b, and terminals of the smoothing capacitors 7, for example, by welding. With this connection, an electric circuit is formed, which extends from the filter 13 to upper arms of the power modules 6a and 6b via the power supply relay 65.

The power modules 6a and 6b are switched on/off to supply or not to supply large current to the motor 2, which leads to switching noise and fluctuations in the power supply system. To avoid the problems described above, the smoothing capacitors 7 of relatively large capacitance are connected to the respective phases. It is desired that nodes therebetween be located near power supply system lines for the power modules 6a and 6b. In this structure, the relay member 9 is provided on the mounting portion 8g on which the control board 3 is not mounted, to thereby secure a space available for the large smoothing capacitors 7. As a result, the relay member 9 is located very close to the power modules 6a and 6b and hence, the smoothing capacitors 7 can be connected to a certain position of each power supply system line.

The feeding terminals 9a are U-phase, V-Phase, and W-phase feeding terminals. The three feeding terminals 9a are connected, for example, by welding to the three phase terminals 28 led out of the annular wiring portion 27 and the three-phase feeding terminals 6d of the power modules 6a and 6b. One end 9amU of the U-phase feeding terminal 9a is connected to the phase terminal 28U, and another end 9aiU thereof is connected to a U-phase output terminal of the power module 6a. One end 9amV of the V-phase feeding terminal 9a is connected to the phase terminal 28V, and another end 9aiV thereof is connected to a V-phase output terminal of the power module 6a. One end 9amW of the W-phase feeding terminal 9a is connected to the phase terminal 28W, and another end 9aiW is connected to a W-phase output terminal of the power module 6a. With this connection, an electric circuit is formed, which extends from the inverter circuit 6 to the three-phase windings 24, that is, an electric circuit to supply three-phase currents for driving the motor 2.

Now, a positional relationship of the feeding terminals 9a and the phase terminals 28 with the power modules 6a and 6b is described.

The one ends 9amU, 9amV, and 9amW of the three feeding terminals 9a are led out of the resin-molded member 9f toward the output side, and then bent and led out to a position on a radially outer side of the resin-molded member 9f. The phase terminals 28U, 28V, and 28W led out of the annular wiring portion 27 pass through the frame 29 and the base portion 8a at certain radial positions corresponding to the one ends 9amU, 9amV, and 9amW of the feeding terminals 9a, respectively, and are led out into the housing 10. The phase terminals 28U, 28V, and 28W led out into the housing 10 are connected to the one ends 9amU, 9amV, and 9amW of the feeding terminals 9a.

The one ends 9amU, 9amV, and 9amW of the feeding terminals 9a, which protrude from the resin-molded member 9f to the output side, and are then sequentially bent to the radially outer side, the output side, and the radially outer side, are connected to the phase terminals 28U, 28V, and 28W, respectively, as described above. With this structure, the feeding terminals 9a and the phase terminals 28 are connected at positions near the motor 2. This means that the connection positions are outside a space on a radially outer side of the mounting portion 8g on which to mount the relay member 9. Consequently, a space on the non-output side of the connection positions, that is, the space on a radially outer side of the mounting portion 8g becomes available, with the result that a larger mounting space for the relay member 9 is obtained with this arrangement, the relay member 9 can secure an accommodating space for the smoothing capacitors 7 without increasing axial lengths of the mounting portion 8g and the relay member 9. Further, it is not required to form a recess as is formed in the heat sink to accommodate the smoothing capacitor in Patent Literature 1. Thus, there is no fear that heat capacity of the heat sink 8 is reduced due to the presence of the recess to accommodate the smoothing capacitors, and that heat radiating property of components of the control unit 1 is impaired.

The three accommodating portions 9d in which to mount the smoothing capacitors 7 are arranged side by side in the axial direction in the relay member 9. The respective accommodating portions 9d have three support portions 9c that are made from an elastic member, and that protrude radially outward from the resin-molded member 9f. One of the three support portions 9c is located on the non-output side, and the other two support portions 9c are located on the output side. The two support portions 9c located on the output side are spaced from each other in a width direction of the resin-molded member 9f. For example, the smoothing capacitor 7 for the U phase is inserted to a corresponding accommodating portion 9d while pushing back three support portions 9cU1, 9cU2, and 9cU3. Then, the smoothing capacitor 7 is held in the accommodating portion 9d by restoring force of the support portions 9cU1, 9cU2, and 9cU3. In this way, the three smoothing capacitors 7 are arranged in a row along the axial direction with their length direction set as the width direction of the resin-molded member 9f. The three smoothing capacitors 7 are thus provided vertically.

In FIG. 2 and FIG. 4, the power module 6a operates for two phases, and the power module 6b operates for one phase. Therefore, the three smoothing capacitors 7 are provided in the accommodating portions 9d in such a manner that terminals of two of the smoothing capacitors 7 face the same direction, and a terminal of the one remaining smoothing capacitor 7 faces a direction opposite thereto.

The relay member 9 is fixed, for example, with screws to the column portion 8b of the heat sink 8. In the first embodiment, the filter 13 is provided outside the housing 10 but can be provided to the relay member 9.

At the non-output side end portion of the output shaft 21, the sensor rotor 5b is mounted. When the sensor rotor 5b is a magnet rotor, the rotation sensor 5a is provided to face the magnet rotor. The rotation sensor 5a is mounted on the rotation sensor substrate 4. In this case, the rotation sensor 5a is a magnetic sensor, and can be a magnetic sensor that adopts, for example, a magneto-resistive effect element. The rotation sensor 5a is mounted on the rotation sensor substrate 4, and electrically connected to the control board 3 via the relay member 9 through, for example, the power supply system line and the signal line as wiring patterns.

As illustrated in FIG. 2, the rotation sensor substrate 4 is provided in the recess 8c that opens to a lower portion of the base portion 8a of the heat sink 8, and to the mounting portion 8d of the column portion 8b, and is fixed to the recess 8c, for example, with screws. Specifically, the rotation sensor substrate 4 is provided to be surrounded by the heat sink 8, and is thus shielded from other portions. This structure also contributes to preventing reduction in an available space in the housing 10 that is caused by providing the mounted rotation sensor substrate 4. Further, the rotation sensor 5a is provided inside the recess 8c so as to face the sensor rotor 5b.

Effects attained by the thus-configured device are described.

The heat sink 8, the power modules 6a and 6b, and the control board 3 are arranged substantially in parallel to the output shaft 21, that is, provided vertically, and hence a product size can be reduced, particularly in the radial direction.

Further, the heat sink 8 includes the base portion 8a and the column portion 8b, and the column portion 8b is provided on the extension of the output shaft 21 in the axial direction. At the non-output side end portion of the output shaft 21, the sensor rotor 5b is provided. The rotation sensor 5a for detecting rotation of the rotor 23 is provided inside the recess 8c formed in the base portion 8a, and located opposite to the sensor rotor 5b. This structure enables reduction in device size, particularly in the axial direction. In addition, the rotation sensor 5a can be provided without forming in the heat sink 8 a hole large enough for the output shaft 21 to pass through unlike the structure of Patent Literature 2. Therefore, it is possible to secure heat capacity of the heat sink 8 and improve heat radiating property.

Further, the rotation sensor 5a for detecting rotation angle of the rotor 23 is provided on the output side of the base portion 8a. Thus, a protruding portion of the output shaft 21 from the bearing 26a, to which the sensor rotor 5b is to be mounted, is shortened. With this structure, a detection accuracy is less affected by an accuracy of assembling the sensor rotor 5b to the output shaft 21. Consequently, it is possible to improve the accuracy of detecting the rotation angle and improve motor performance. Further, even when the size of any component of the control unit 1 is changed, it is not required to change the length of the output shaft 21. Thus, motor parts can be standardized, to thereby reduce costs.

Further, the motor 2 and the control unit 1 are separate and independent from each other across the frame 29 and hence, an assembly step for the motor 2 and that for the control unit 1 can be performed independently.

Moreover, the control board 3 is separated from the phase terminals 28 of the motor 2, and thus the control board 3 can be provided without being affected by various types of noise.

The control board 3 is provided in parallel to the output shaft 21, that is, provided vertically. With this structure, the mountable area thereof can be increased without upsizing the device in the radial direction, and hence the product size can be reduced. Further, the power modules 6a and 6b are mounted on the two mounting portions 8e and 8f of the column portion 8b of the heat sink 8, which are adjacent to the mounting portion 8d for the control board 3 in the circumferential direction. With this structure, a connection length between each of the power modules 6a and 6b, and the control board 3 can be reduced.

The positions at which the feeding terminals 9a on the control unit 1 side are connected to the phase terminals 28U, 28V, and 28W on the motor 2 side, are on the output side of the mounting portion 8g instead of the mounting portions 8e and 8f on which the power modules 6a and 6b are mounted, respectively. With this structure, effective areas of the mounting portions 8e and 8f on which to mount the power modules 6a and 6b can be enlarged. Consequently, the mounting portions 8e and 8f can secure mounting areas for the power modules 6a and 6b without increasing their axial lengths, to thereby prevent the device from being upsized, particularly in the axial direction. In addition, an effective area of the mounting portion 8d on which to mount the control board 3 can be enlarged, so that the device can be downsized, particularly in the radial direction.

Further, it is not required to shift the power modules 6a and 6b radially inward for securing the connection positions between the feeding terminals 9a on the control unit 1 side and the phase terminals 28 on the motor 2 side. This means that the positions of the signal terminals 6c extending from the power modules 6a and 6b are not shifted radially inward, so that the mountable area of the control board 3 can be secured without increasing the axial length thereof. Consequently, the product can be downsized, particularly in the axial direction.

Further, such arrangement that the rotation sensor 5a is provided separately and independently from the power modules 6a and 6b, is effective in terms of noise as well. For example, the rotation sensor 5a, which is provided inside the recess 8c, is surrounded by the aluminum-made heat sink 8 and is thus hardly affected by noise generated from on/off operations for current supply to the motor windings.

Second Embodiment

Figure 5:
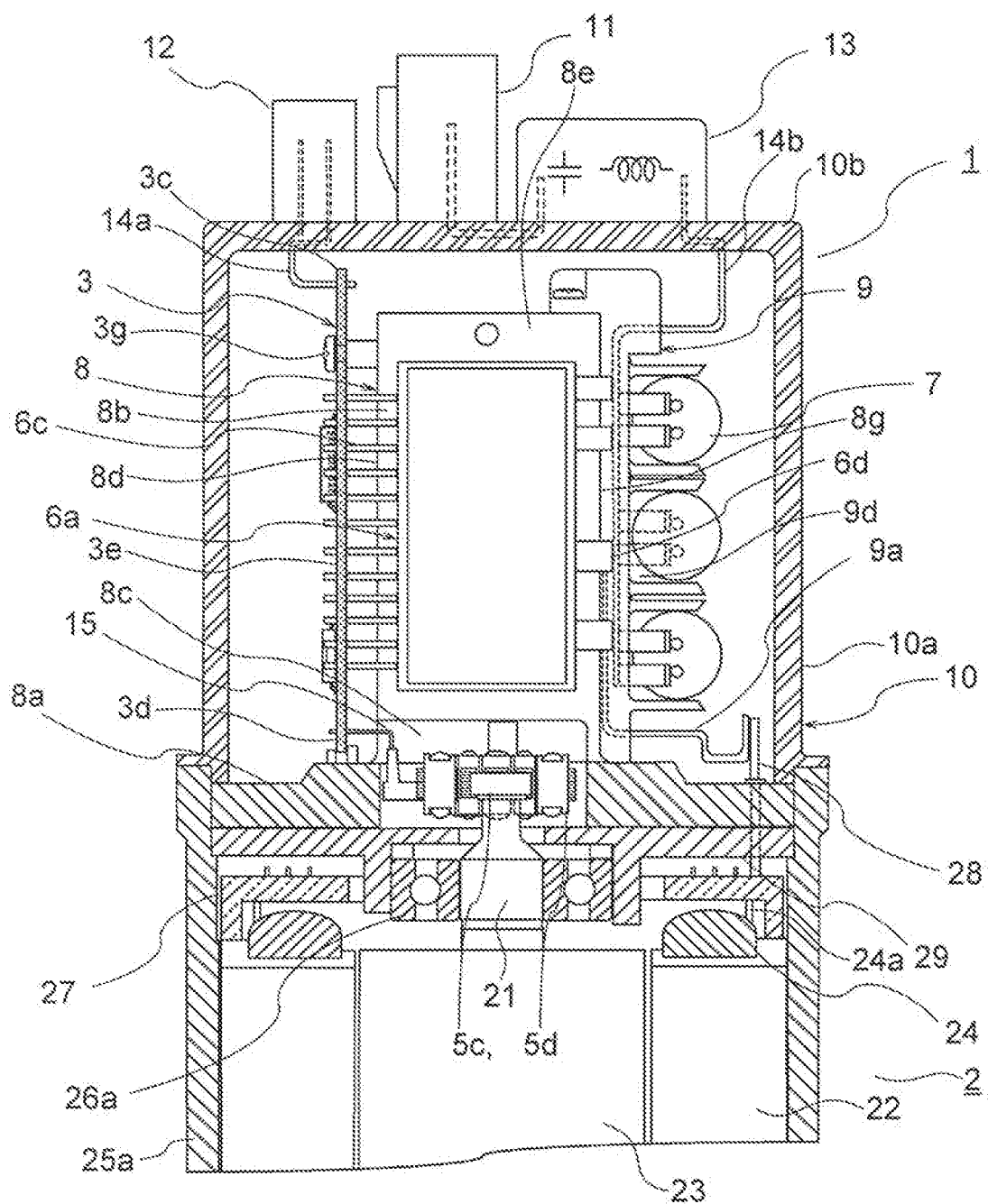
FIG. 5 is a partial sectional view of an electric power steering device according to a second embodiment of the present invention.

FIG. 5 is a partial sectional view of an electric power steering device according to a second embodiment of the present invention. In the first embodiment, the magneto-resistive effect element is used as the rotation sensor 5a, but in the second embodiment, an electromagnetic-induction one, for example, a resolver is used as the rotation sensor. Further, in FIG. 5, a part of the upper portion of the motor 2, and the control unit 1 are illustrated, and equivalent components to those of FIG. 2 are denoted by identical reference symbols.

In FIG. 5, a sensor rotor 5c is mounted to the non-output side end portion of the output shaft 21, and is provided in the recess 8c. A resolver stator 5d as the rotation sensor is provided to surround the sensor rotor 5c, and is fixed to the recess 8c. The sensor rotor 5c requires no magnet and has a petal-like shape having parts close to and distant from the resolver stator 5d. The resolver stator 5d includes a core formed from a plurality of magnetic thin plates stacked on one another. The core has wound thereon each two of excitation windings, SIN windings, and COS windings. Those six windings are connected to the connection holes of the lower edge 3d of the control board 3 via extension terminals 15 as signal terminals.

The other configuration is the same as that of the first embodiment.

Hence, according to the second embodiment, the same effects as those of the first embodiment can also be obtained. Further, also when the resolver type rotation sensor is used, the resolver stator 5d can be provided in the recess 8c of the heat sink 8, and thus the device can be downsized.

Third Embodiment

Figure 6:
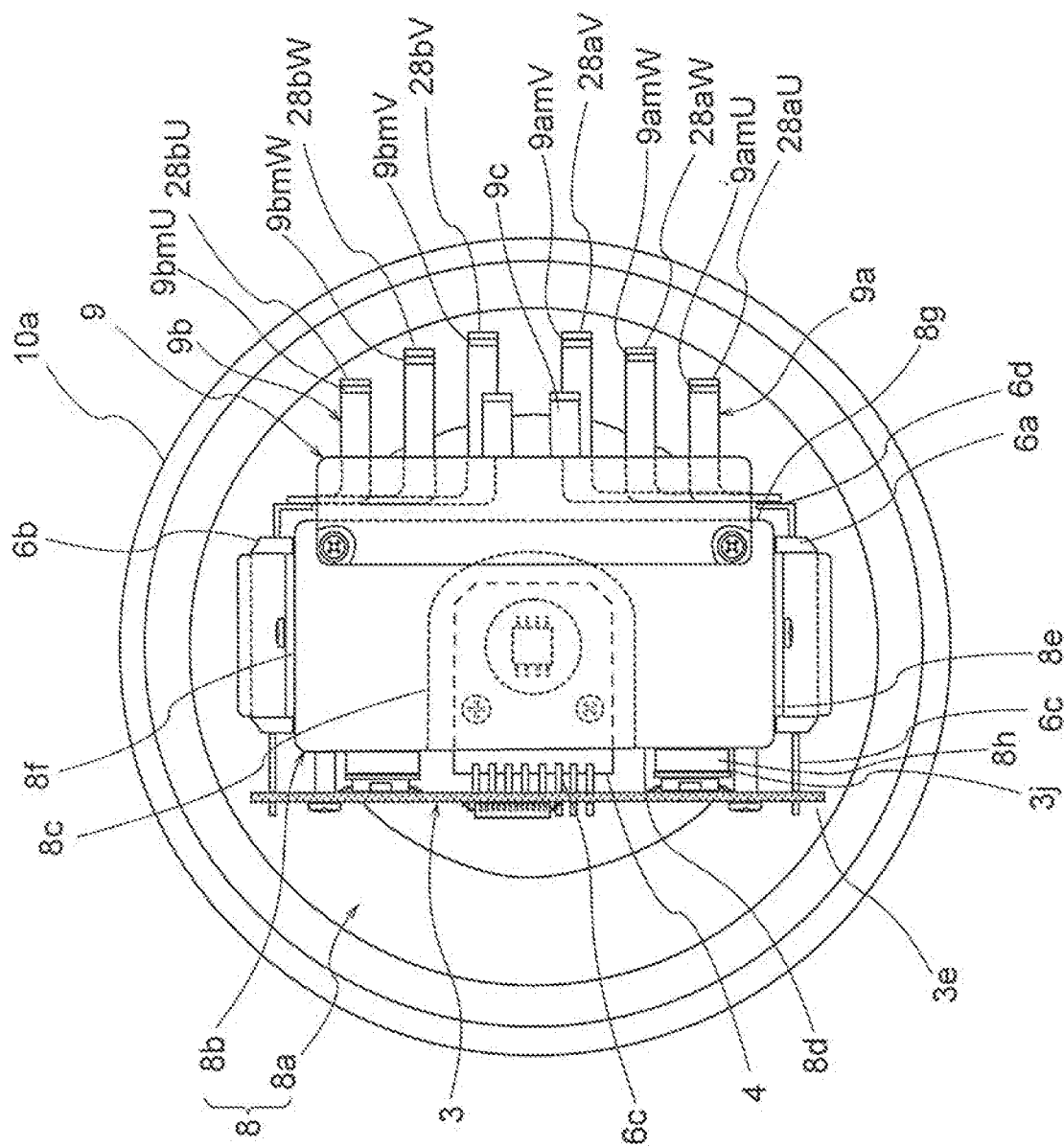
FIG. 6 is a transparent view of a control unit of an electric power steering device according to a third embodiment of the present invention and its surroundings, as viewed from a non-output side.

FIG. 6 is a transparent view of a control unit of an electric power steering device according to a third embodiment of the present invention and its surroundings, as viewed from a non-output side. In the first and second embodiments, the description is given only of the case in which the inverter circuit 6 for driving the motor 2 is the circuit of one system. In the third embodiment, however, description is given of a case of inverter circuits of two systems. In FIG. 6, the control unit 1 is illustrated as viewed from the connector side, and equivalent components to those of FIG. 3 are denoted by identical reference symbols.

In the circuit diagram of FIG. 1, there are provided one set of three-phase windings obtained by star-connecting the U-phase, V-phase, and W-phase windings 24, the power supply relay 65 and the inverter circuit 6 of one system configured to supply current to the one set of three-phase windings, and the single driving circuit 31 configured to drive the inverter circuit 6. In the third embodiment, there are provided, although not illustrated, two sets of three-phase windings each obtained by star-connecting U-phase, V-phase, and W-phase windings 24, power supply relays 65 and inverter circuits 6 of two systems configured to supply current to each of the two sets of three-phase windings, and two driving circuits 31 configured to drive each of the inverter circuits 6 of the two systems.

In FIG. 6, power modules 6a and 6b are mounted on the mounting portions 8e and 8f of the column portion 8b of the heat sink 8, respectively. One of the power modules 6a and one of the power modules 6b form the power supply relay 65 and the inverter circuit 6 of one of the systems configured to drive the motor 2. Specifically, the power module 6a described above is obtained by resin-sealing a plurality of switching elements as components of the inverter circuit 6 and the power supply relay 65 of the one system, which are being mounted on wirings made from a copper plate, for example. The power module 6b described above is obtained by resin-sealing a plurality of switching elements as components of the inverter circuit 6 and the power supply relay 65 of the remaining system, which are being mounted on wirings made from a copper plate, for example. The arrangement of the signal terminals 6c to be connected to the control board 3, and the power supply terminals 6e and the feeding terminals 6d to be connected to the relay member 9 is the same as that of the first embodiment.

Further, phase terminals 28 (28aU, 28aV, 28aW, 28bU, 28bV, and 28bW), which are configured to relay phase currents of the motor between the motor 2 and the control unit 1, and are led out of the annular wiring portion 27, are connected to the feeding terminals 6d provided in the power modules 6a and 6b via feeding terminals 9a and 9b (9amU, 9amV, 9amW, 9bmU, 9bmV, and 9bmW) of the relay member 9.

The relay member 9 is mounted on the mounting portion 8g instead of the mounting portions 8e and 8f on which the power modules 6a and 6b are mounted, respectively. With this arrangement, even when the feeding terminals 9amU and 9bmU, for example, overlap the power modules 6a and 6b as viewed from the direction orthogonal to a mounting surface of the mounting portion 8g, it is not required to change the positions of the power modules 6a and 6b in accordance with the arrangement of the feeding terminals 9amU and 9bmU, for example. As described above, the change in arrangement of the feeding terminals 9a and 9b has no influence on the arrangement of the power modules 6a and 6b. Therefore, also in the third embodiment, it is possible to avoid any problem that may arise from changing the arrangement of the power modules 6a and 6b. In other words, the change in positions of the power modules 6a and 6b involves changing positions of the connection portions between the power modules 6a and 6b and the signal lines in the control board 3, and consequently requires design change of the control board 3. Further, when the power modules 6a and 6b are moved radially inward, a mountable area for components of the control board 3 is reduced.

Further, regarding heat generating components that reach high temperature particularly easily due to a loss during the operation among the components of the control circuit mounted on the control board 3, such heat generating components are brought into contact with heat radiating portions 8h protruding from some portions of the heat sink 8, via heat radiating members 3j having a high heat conductivity such as glue or sheets, for example. This allows heat generated in the heat generating components to be radiated effectively to the heat radiating portions 8h, to thereby prevent excessive temperature rise.

As described above, according to the configuration including the inverter circuits 6 of two systems as well, the same effects as those of the first and second embodiments can be obtained.

Note that in the embodiments described above, the three phase windings are connected together through star connection but may be connected together through delta connection.

REFERENCE SIGNS LIST 1 control unit, 2 motor, 3 control board, 3c upper edge, 3d lower edge, 3e side edge, 4a signal terminal, 5a rotation sensor, 5b,5c sensor rotor, 5d resolver stator (rotation sensor), 6a, 6b power module, 6c signal terminal, 6d feeding terminal, 8 heat sink, 8a base portion, 8b column portion, 8c recess, 8d,8e,8f,8g mounting portion, 9 relay member, 9a,9b feeding terminal, 10 housing, 11 power supply connector, 12 signal connector, 14a signal terminal, 15 extension terminal (signal terminal), 21 output shaft, 22 stator, 23 rotor, 24 winding, 25 motor case, 25a cylindrical portion, 25b bottom portion, 28 phase terminal, 29 frame

The invention claimed is:
1. An electric power steering device, comprising:
a motor; and
a control unit, which is provided side by side in a row with the motor in an axial direction of an output shaft of the motor, and is integrated with the motor,
the control unit including:
a power module including a plurality of switching elements configured to supply current to the motor;
a control board configured to output a control signal to each of the plurality of switching elements;
a heat sink configured to allow heat radiation from the control unit;
a housing that forms an outer case of the control unit;
a sensor rotor mounted to an end portion of the output shaft on the control unit side; and
a rotation sensor configured to detect rotation of the sensor rotor,
the heat sink including:
a base portion provided on the motor side in the housing; and
a column portion extending from the base portion toward an opposite side to the motor along an extension of the output shaft,
the power module and the control board being arranged, in parallel to the output shaft, in the housing, and
the rotation sensor being provided in a recess formed in an opposite position to the sensor rotor, of the base portion.

2. The electric power steering device according to claim 1,
wherein the motor includes:
a bottomed cylindrical motor case having a cylindrical portion and a bottom portion formed to close an opening of the cylindrical portion on one side;
a frame mounted to the motor case to close an opening of the cylindrical portion on another side;
a rotor provided in the motor case while being fixed to the output shaft that is rotatably supported to the bottom portion and the frame; and
a stator provided to surround the rotor and held in the cylindrical portion, and
wherein the base portion is in contact with a surface of the frame on an opposite side to the rotor and an inner peripheral wall surface of the cylindrical portion.

3. The electric power steering device according to claim 2,
wherein the column portion has a polygonal column shape having a plurality of mounting portions defined by flat surfaces parallel to the axial direction of the output shaft, and
wherein the control board is provided on one of the plurality of mounting portions, and
wherein the power module is provided on a mounting portion adjacent in a circumferential direction to the one mounting portion out of the plurality of mounting portions.

4. The electric power steering device according to claim 3,
wherein a connector configured to input and output power and a signal to and from the outside is provided at an end portion of the housing on an opposite side to the motor,
wherein the control board has a flat rectangular plate shape, and is provided on the one mounting portion with a length direction thereof being set as the axial direction of the output shaft,
wherein an electrical connection terminal is formed on at least one of an upper edge, a lower edge, and a side edge of the control board, and
wherein a signal terminal of the connector is connected to the electrical connection terminal provided to the upper edge of the control board,
wherein a signal terminal of the rotation sensor is connected to the electrical connection terminal provided to the lower edge of the control board, and wherein a signal terminal of the power module is connected to the electrical connection terminal provided to the side edge of the control board.

5. The electric power steering device according to claim 1,
wherein the column portion has a polygonal column shape having a plurality of mounting portions defined by flat surfaces parallel to the axial direction of the output shaft, and
wherein the control board is provided on one of the plurality of mounting portions, and
wherein the power module is provided on a mounting portion adjacent in a circumferential direction to the one mounting portion out of the plurality of mounting portions.

6. The electric power steering device according to claim 5,
wherein a connector configured to input and output power and a signal to and from the outside is provided at an end portion of the housing on an opposite side to the motor,
wherein the control board has a flat rectangular plate shape, and is provided on the one mounting portion with a length direction thereof being set as the axial direction of the output shaft,
wherein an electrical connection terminal is formed on at least one of an upper edge, a lower edge, and a side edge of the control board, and
wherein a signal terminal of the connector is connected to the electrical connection terminal provided to the upper edge of the control board,
wherein a signal terminal of the rotation sensor is connected to the electrical connection terminal provided to the lower edge of the control board, and
wherein a signal terminal of the power module is connected to the electrical connection terminal provided to the side edge of the control board.

7. The electric power steering device according to claim 1, wherein the control unit further includes a relay that is provided on a mounting portion out of the plurality of mounting portions that is adjacent, in A circumferential direction, to the mounting portion on which the power module is provided and is not adjacent, in the circumferential direction, to the one mounting portion on which the control board is provided.

8. An electric power steering device comprising:
a motor; and
a control unit, which is provided side by side in a row with the motor in an axial direction of an output shaft of the motor, and is integrated with the motor,
the control unit including:
a power module including a plurality of switching elements configured to supply current to the motor;
a control board configured to output a control signal to each of the plurality of switching elements;
a heat sink configured to allow heat radiation from the control unit;
a housing that forms an outer case of the control unit; and
a rotation sensor configured to detect rotation of the output shaft,
the heat sink including:
a base portion provided on the motor side in the housing; and
a column portion extending from the base portion toward an opposite side to the motor along an extension of the output shaft,
the power module and the control board being arranged, in parallel to the output shaft, in the housing, and
phase terminals of windings of a stator of the motor being led out into the housing, and connected to feeding terminals of the power module at portions on an outer side in a circumferential direction in a region on a radially outer side of the power module.

9. The electric power steering device according to claim 8, wherein the phase terminals are connected to the feeding terminals at positions closer to the motor than the power module.

10. The electric power steering device according to claim 9,
wherein the motor includes:
a bottomed cylindrical motor case having a cylindrical portion and a bottom portion formed to close an opening of the cylindrical portion on one side;
a frame mounted to the motor case to close an opening of the cylindrical portion on another side;
a rotor provided in the motor case while being fixed to the output shaft that is rotatably supported to the bottom portion and the frame; and
a stator provided to surround the rotor and held in the cylindrical portion, and
wherein the base portion is in contact with a surface of the frame on an opposite side to the rotor and an inner peripheral wall surface of the cylindrical portion.

11. The electric power steering device according to claim 10,
wherein the column portion has a polygonal column shape having a plurality of mounting portions defined by flat surfaces parallel to the axial direction of the output shaft, and
wherein the control board is provided on one of the plurality of mounting portions, and
wherein the power module is provided on a mounting portion adjacent in a circumferential direction to the one mounting portion out of the plurality of mounting portions.

12. The electric power steering device according to claim 11,
wherein a connector configured to input and output power and a signal to and from the outside is provided at an end portion of the housing on an opposite side to the motor,
wherein the control board has a flat rectangular plate shape, and is provided on the one mounting portion with a length direction thereof being set as the axial direction of the output shaft,
wherein an electrical connection terminal is formed on at least one of an upper edge, a lower edge, and a side edge of the control board, and
wherein a signal terminal of the connector is connected to the electrical connection terminal provided to the upper edge of the control board,
wherein a signal terminal of the rotation sensor is connected to the electrical connection terminal provided to the lower edge of the control board, and
wherein a signal terminal of the power module is connected to the electrical connection terminal provided to the side edge of the control board.

13. The electric power steering device according to claim 9,
wherein the column portion has a polygonal column shape having a plurality of mounting portions defined by flat surfaces parallel to the axial direction of the output shaft, and wherein the control board is provided on one of the plurality of mounting portions, and
wherein the power module is provided on a mounting portion adjacent in a circumferential direction to the one mounting portion out of the plurality of mounting portions.

14. The electric power steering device according to claim 13,
wherein a connector configured to input and output power and a signal to and from the outside is provided at an end portion of the housing on an opposite side to the motor,
wherein the control board has a flat rectangular plate shape, and is provided on the one mounting portion with a length direction thereof being set as the axial direction of the output shaft,
wherein an electrical connection terminal is formed on at least one of an upper edge, a lower edge, and a side edge of the control board, and
wherein a signal terminal of the connector is connected to the electrical connection terminal provided to the upper edge of the control board,
wherein a signal terminal of the rotation sensor is connected to the electrical connection terminal provided to the lower edge of the control board, and
wherein a signal terminal of the power module is connected to the electrical connection terminal provided to the side edge of the control board.

15. The electric power steering device according to claim 8,
wherein the motor includes:
a bottomed cylindrical motor case having a cylindrical portion and a bottom portion formed to close an opening of the cylindrical portion on one side;
a frame mounted to the motor case to close an opening of the cylindrical portion on another side;
a rotor provided in the motor case while being fixed to the output shaft that is rotatably supported to the bottom portion and the frame; and
a stator provided to surround the rotor and held in the cylindrical portion, and
wherein the base portion is in contact with a surface of the frame on an opposite side to the rotor and an inner peripheral wall surface of the cylindrical portion.

16. The electric power steering device according to claim 15,
wherein the column portion has a polygonal column shape having a plurality of mounting portions defined by flat surfaces parallel to the axial direction of the output shaft, and
wherein the control board is provided on one of the plurality of mounting portions, and
wherein the power module is provided on a mounting portion adjacent in a circumferential direction to the one mounting portion out of the plurality of mounting portions.

17. The electric power steering device according to claim 16,
wherein a connector configured to input and output power and a signal to and from the outside is provided at an end portion of the housing on an opposite side to the motor,
wherein the control board has a flat rectangular plate shape, and is provided on the one mounting portion with a length direction thereof being set as the axial direction of the output shaft,
wherein an electrical connection terminal is formed on at least one of an upper edge, a lower edge, and a side edge of the control board, and
wherein a signal terminal of the connector is connected to the electrical connection terminal provided to the upper edge of the control board,
wherein a signal terminal of the rotation sensor is connected to the electrical connection terminal provided to the lower edge of the control board, and
wherein a signal terminal of the power module is connected to the electrical connection terminal provided to the side edge of the control board.

18. The electric power steering device according to claim 8,
wherein the column portion has a polygonal column shape having a plurality of mounting portions defined by flat surfaces parallel to the axial direction of the output shaft, and
wherein the control board is provided on one of the plurality of mounting portions, and
wherein the power module is provided on a mounting portion adjacent in a circumferential direction to the one mounting portion out of the plurality of mounting portions.

19. The electric power steering device according to claim 18,
wherein a connector configured to input and output power and a signal to and from the outside is provided at an end portion of the housing on an opposite side to the motor,
wherein the control board has a flat rectangular plate shape, and is provided on the one mounting portion with a length direction thereof being set as the axial direction of the output shaft,
wherein an electrical connection terminal is formed on at least one of an upper edge, a lower edge, and a side edge of the control board, and
wherein a signal terminal of the connector is connected to the electrical connection terminal provided to the upper edge of the control board,
wherein a signal terminal of the rotation sensor is connected to the electrical connection terminal provided to the lower edge of the control board, and
wherein a signal terminal of the power module is connected to the electrical connection terminal provided to the side edge of the control board.

* * * * *